Sept. 2, 1930. J. R. JAHN ET AL 1,774,713
ROTARY VALVE MECHANISM
Filed Aug. 1, 1928 5 Sheets-Sheet 3

INVENTORS.
John R. Jahn,
John W. Shannon.
BY Townsend, Loftus & Abbett
ATTORNEYS.

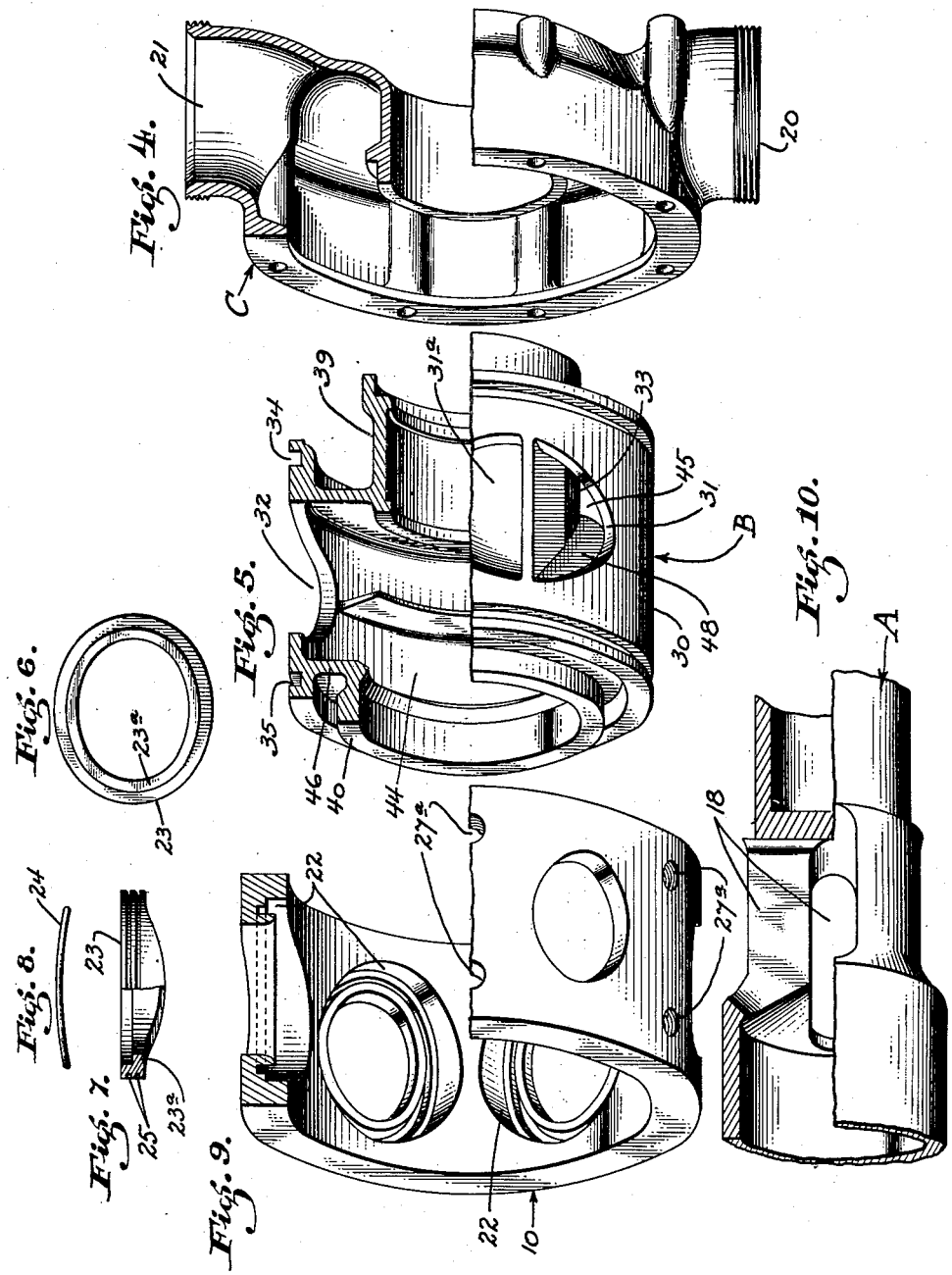

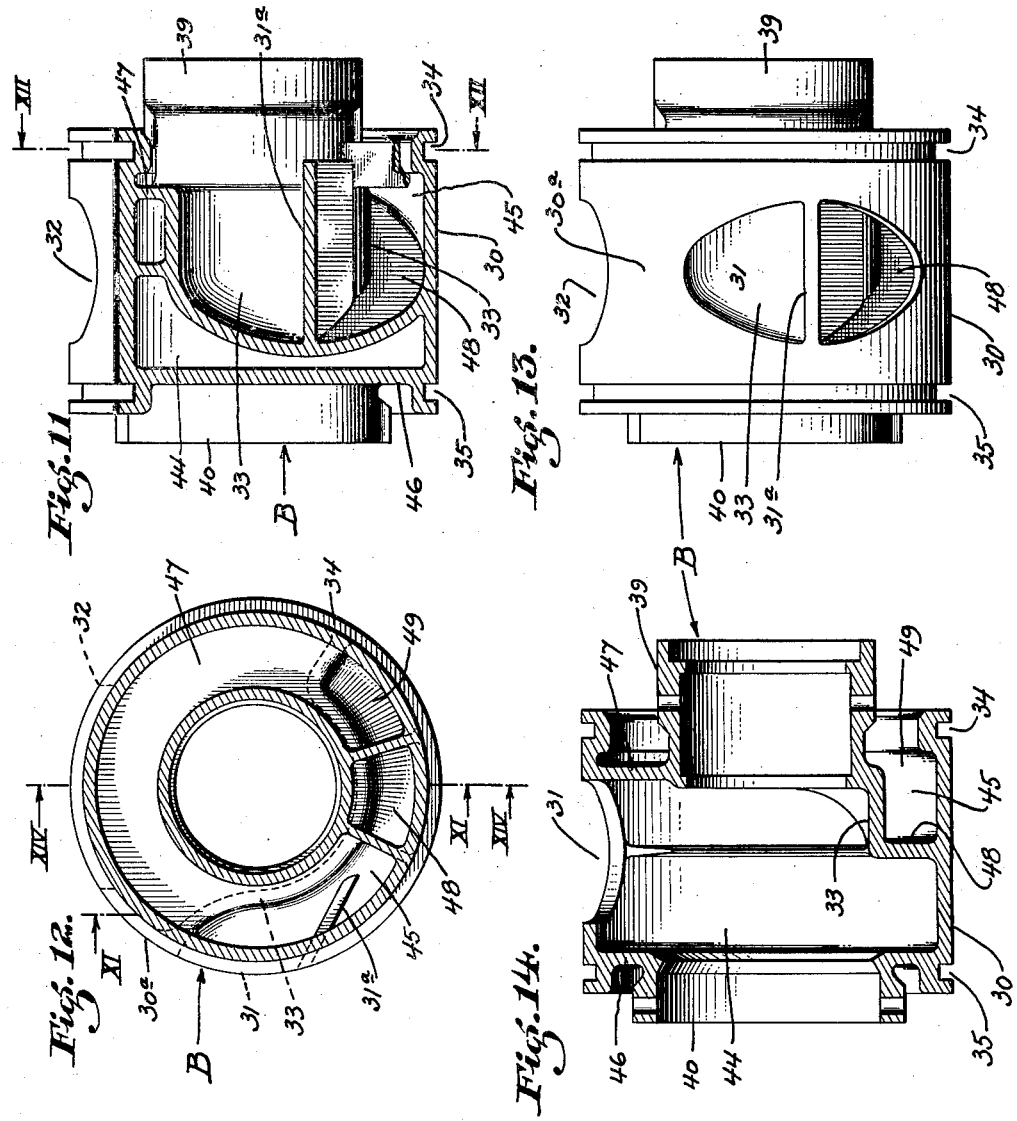

Patented Sept. 2, 1930

1,774,713

UNITED STATES PATENT OFFICE

JOHN R. JAHN, OF BERKELEY, AND JOHN W. SHANNON, OF SAN RAFAEL, CALIFORNIA, ASSIGNORS TO SHANNON ROTARY VALVE MOTOR CO., A CORPORATION OF CALIFORNIA

ROTARY VALVE MECHANISM

Application filed August 1, 1928. Serial No. 296,670.

This invention relates to a rotary valve mechanism such as illustrated in patent to Shannon et al., Serial No. 1,666,513 entitled "Rotary valve mechanism" issued April 17, 1928, and especially to a modified form of the valve mechanism which is especially adapted to motors in which the cylinders are concentrically arranged about the valve.

The valve mechanism disclosed in Patent 1,666,513 above referred to, requires one rotary sleeve valve for each cylinder; each valve is placed in the head of the cylinder; separate exhaust and inlet passages must be formed in each head; a pair of sealing plugs is required, one for each passage, and the sleeve valves must be provided with gears which intermesh with each other to insure uniform rotation of each sleeve valve and predetermined positioning of each sleeve valve with relation to an adjacent valve.

The valve mechanism forming the subject of the present application requires but a single rotary sleeve valve for a number of cylinders, the valve is positioned centrally with the cylinders arranged concentrically and exterior of the same. One port only is formed in each cylinder head, which functions alternately as exhaust and inlet port, and only one sealing plug is used for each cylinder head. A direct gear drive for operating valve is eliminated, and the number of individual parts required is reduced to a minimum.

Figure 1:
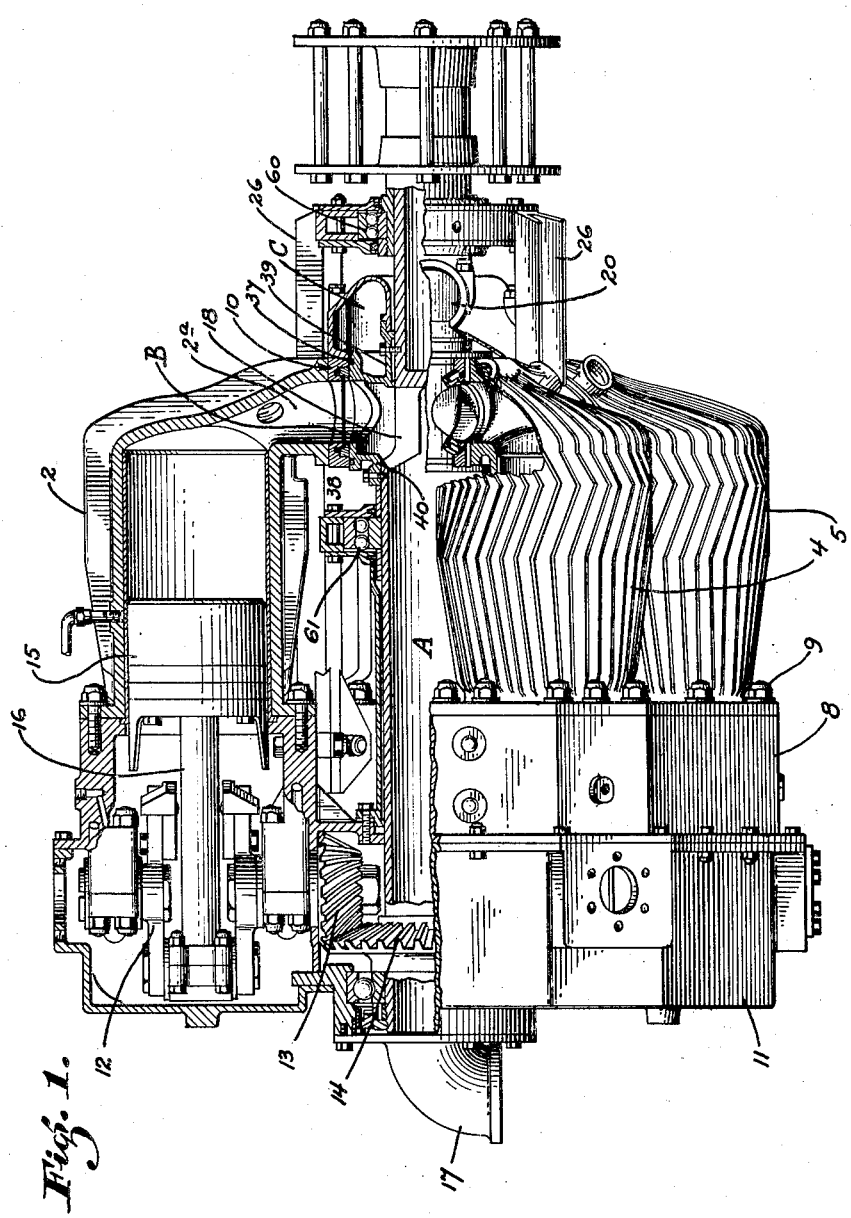
Figure 2:
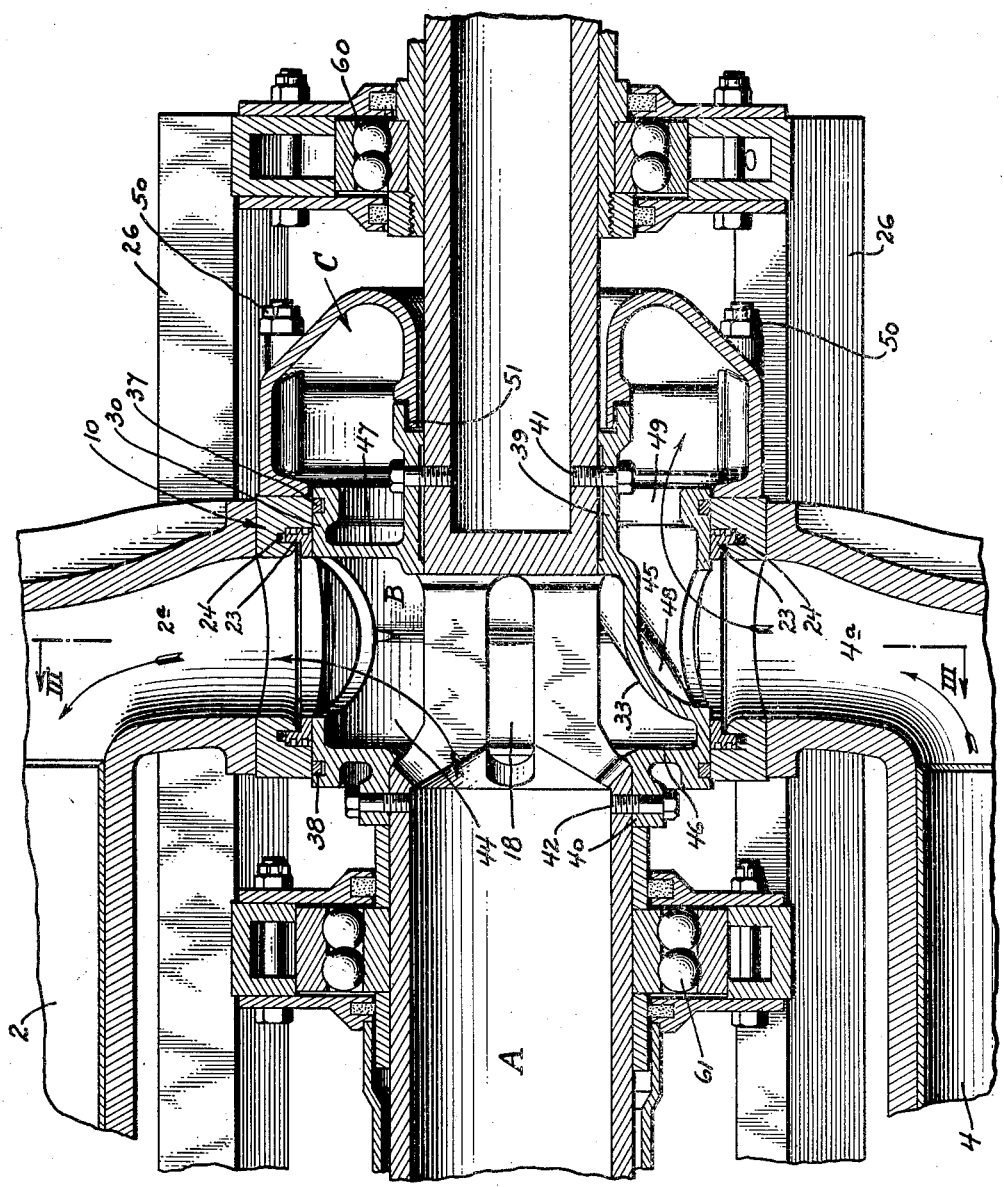
Figure 3:
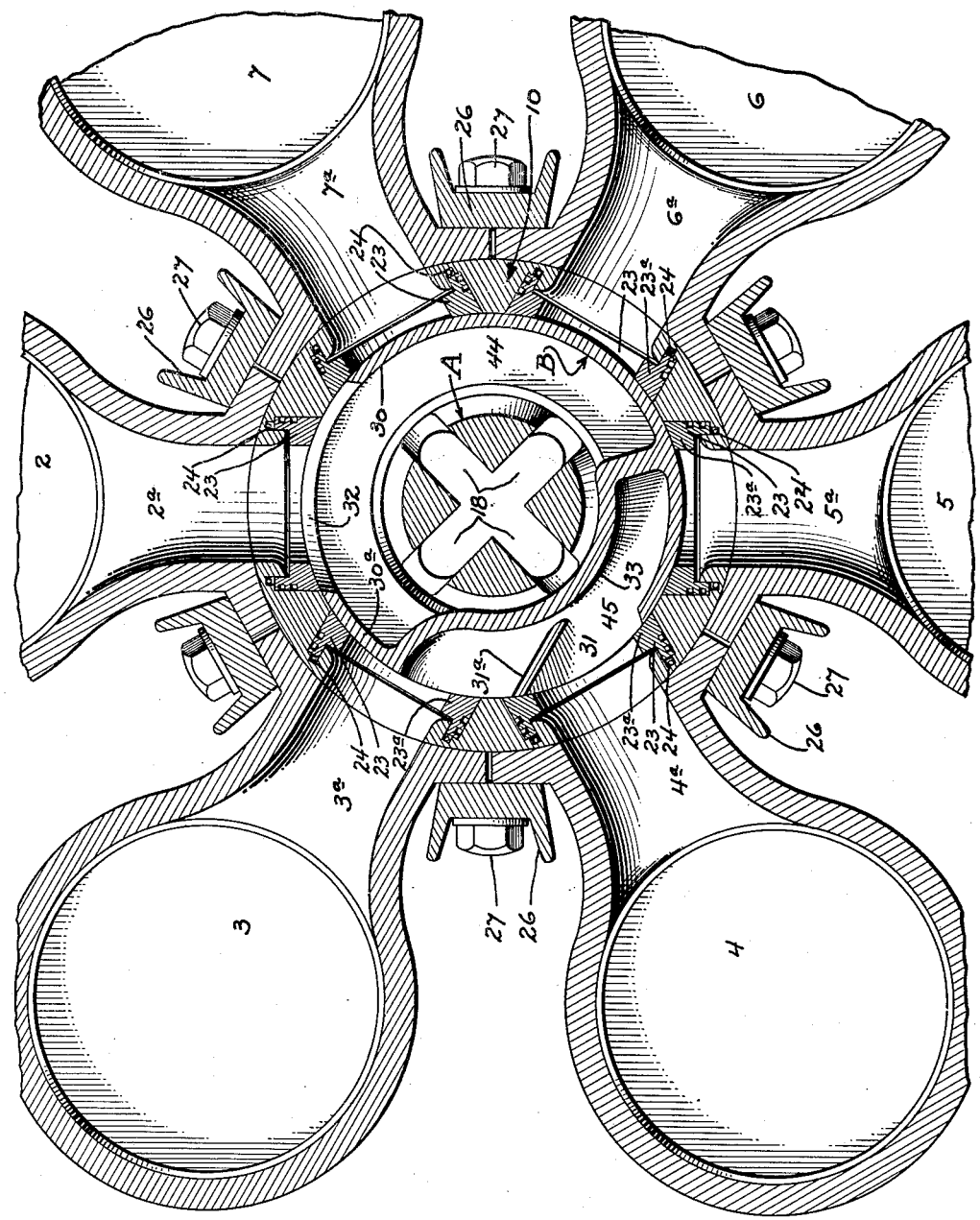

The valve mechanism is shown by way of illustration in the accompanying drawings in which:

Fig. 1 is a side elevation of a multiple cylinder motor, showing the application of the valve mechanism, said figure being partially in section, Fig. 2 is an enlarged vertical section of the valve mechanism showing its position with relation to the drive shaft of the cylinders, said view also showing the exhaust manifold and the intake manifold which in this instance is a passage formed in the drive shaft, Fig. 3 is a cross section taken on line III—III of Fig. 2, Fig. 4 is a perspective view of the exhaust manifold, said view being partially shown in section and partially broken away, Fig. 5 is a perspective view of the rotary sleeve valve, said view being shown partially in section and partially broken away, Fig. 6 is a front view of one of the sealing plugs, Fig. 7 is a side elevation of the same partially in section, Fig. 8 is a side elevation of the sealing plug spring, Fig. 9 is a perspective view of the valve casing, said view being shown partially in section and partially broken away, Fig. 10 is a perspective view of the central portion of the drive shaft, said view being shown partially in section and partially broken away.

Fig. 11 is a longitudinal section of the rotary sleeve valve, taken on line XI—XI of Fig. 12, Fig. 12 is a cross section of the rotary sleeve valve taken on line XII—XII of Fig. 11, Fig. 13 is a side elevation of the rotary sleeve valve, showing all of the exhaust ports and a portion of the inlet port, Fig. 14 is a longitudinal section of the rotary sleeve valve taken on line XIV—XIV of Fig. 12.

Before entering into a detailed description of the valve mechanism forming the subject matter of the present application it might be well to state that the valve has been particularly designed for motors in which the cylinders are concentrically arranged about the valve, and in view thereof, a multiple cylinder type of motor has been illustrated in Figs. 1, 2 and 3 of the drawings.

The motor employs a main drive shaft A which in this instance is tubular in construction, for the purposes hereinafter to be described. Arranged concentrically with relation to the drive shaft is a plurality of cylinders, such as indicated at 2, 3, 4, 5, 6 and 7. The cylinders are positioned parallel with relation to the drive shaft, and they are equally spaced, as shown in Figs. 1 and 3. The cylinders are supported at one end by the forward portion of a crank case, 8, as by means of bolts 9, while their opposite or head ends are secured to a valve casing generally indicated at 10, see Figs. 3 and 9. The rearward portion of the crank case is indicated at 11, and this, together with the forward portion of the crank case 8, forms a support and enclosure for a series of crank shafts, such as indicated at 12. There is a plurality of crank shafts, one for each cylinder. They are radially disposed with relation to the drive shaft A, and power is transmitted from the crank shafts 12 to the drive shaft A through beveled gears or the like, as indicated at 13 and 14. Each cylinder is provided with a piston 15, and the pistons are connected with the respective crank shafts 12 through means of connecting rods 16.

The main drive shaft, as previously stated, is tubular in construction and in this instance serves as an intake manifold, inasmuch as the explosive mixture is conducted through the shaft to the respective cylinders during the suction stroke of the pistons. As any suitable type of carbureter may be employed, none is illustrated. Such carbureter as may be selected might, however be connected with an elbow such as indicated at 17. This connects with the inner end of the tubular drive shafts and delivers the combustible mixture thereto. The mixture is carried to a point adjacent the other end of the shaft, where it is admitted through ports 18 into a rotary sleeve valve generally indicated at B. The mixture is then delivered to the respective cylinders through ports indicated at $2^a$, $3^a$, $4^a$, $5^a$, $6^a$, and $7^a$ during the suction stroke of the respective pistons. The mixture is then compressed and ignited in the usual manner and is later exhausted through the same rotary sleeve valve which directs the gases to an exhaust manifold generally indicated at C, from where it may be discharged through outlets 20 and 21 (see Fig. 4).

As the valve mechanism whereby the combustible gases and the exhaust gases are regulated forms the subject matter of the present application, a detailed description thereof will be submitted. The valve mechanism is best illustrated in Figs. 2 to 14 inclusive. It consists first of all of the ring shaped valve casing generally indicated at 10, see Figs. 2, 3 and 9. This casing is first of all provided with a plurality of ports which register with the cylinder head ports indicated at $2^a$, $3^a$, $4^a$, $5^a$, $6^a$, and $7^a$, respectively. The ports in the cylinder heads and in the valve casing are elliptical in shape, the desirability of an elliptical shaped port being fully described in Patent 1,666,513 already referred to. The inner face of the valve casing is recessed, as indicated at 22, see Fig. 9, for the reception of freely fitting sealing plugs 23, see Figs. 2, 3, 6 and 7, there being one sealing plug for each valve casing port, and communicating cylinder head port. In other words, there are six sealing plugs if there are six cylinders and communicating ports. The sealing plugs engage the outer face of the sleeve valve B, and maintain a gas-tight joint between the rotating sleeve valve and each stationary cylinder head port, thereby preventing leakage during the suction, compression, firing and exhaust strokes of the respective cylinders. Each sealing plug is provided with an inner shoulder, such as indicated at $23^a$, see Figs. 3 and 7, which projects into the valve casing pocket as shown in Figs. 2, 3 and 9. These shoulders are accordingly exposed to the fluid pressure during compression, firing, etc., and it might accordingly be stated that the plugs are held in engagement with the exterior surface of the sleeve valve by the fluid pressure exerted within the cylinders. The pressure is, however, practically speaking, negative during the suction cycle and a spring is accordingly interposed between the valve casing and each plug, as indicated at 24, see Figs. 3 and 8, this having sufficient tension to maintain the plug in contact with the sleeve valve surface during the suction cycle. Leakage around the plugs is prevented by providing one or more oil grooves as shown at 25, and leakage between the valve casing 10 and the cylinder heads proper is prevented as a permanent joint is formed between each cylinder head and the casing through means of longitudinal standard 26, and bolts 27 extending through the standards and secured in the valve casing 10, the threaded bolt holes for the reception of the bolts 27 being indicated at $27^a$, see Fig. 9.

The sleeve valve proper is best illustrated in Figs. 2, 3, 5, 11, 12, 13 and 14. It consists of an exterior cylindrical shell 30 in which is formed a pair of port openings 31 and 32, the port opening 31 being the exhaust port and the port opening 32 the intake port. These ports are separated with relation to each other by the cylindrical intermediate wall $30^a$, the angular magnitude of said wall being at least as great as the width of the sealing plug openings, to definitely close the cylinder ports $2^a$, $3^a$, $4^a$, $5^a$, $6^a$, and $7^a$ between exhaust and intake periods. The upper and lower ends of the cylindrical shell 30 are provided with annular grooves 34 and 35 for the reception of packing rings, such as shown at 37 and 38, and upper and lower hub members are formed as indicated at 39 and 40. These hub members are secured to the drive shaft A by screws such as indicated at 41 and 42, and rotation of the sleeve valve in unison with the drive shaft is accordingly insured, the ratio of rotation being 1:2 as the gear ratio between the bevelled gears 13 and 14 is 1:2. That is, the crank shafts rotate two revolutions to every one revolution of the main drive shaft, hence making it possible to rotate the valve at the proper rotation ratio to insure four-cycle operation when the pistons are reciprocating.

The ports 18 formed in the main drive shaft, which communicate with the passage formed in the drive shaft, also communicate with a chamber 44 formed within the rotary valve. This chamber in turn communicates with the inlet ports 32, and as this registers with the respective sealing plugs and communicating cylinder head passages 2ª, 3ª, 4ª, 5ª, 6ª and 7ª, the pistons in the communicating cylinders will be on their downward suction stroke and combustible mixture will accordingly be delivered to each cylinder in successive order.

The longitudinal intermediate wall 33 forms the chamber 44, and it also forms a chamber 45 which communicates with the exhaust port. The bottom of the chamber 44 is closed by an annular bottom plate 46, see Fig. 5, while the top of the chamber is closed by an annular top plate 47. The bottom of the chamber 45 is closed by an inclined or helically arranged bottom plate 48, see Figs. 5 and 11. This bottom plate rises upwardly into the top plate 47 and an opening is formed in this plate as indicated at 49. The exhaust gases discharging from the cylinders enter the ports 31; it follows upwardly along the inclined bottom plate 48 and discharges through the upper opening 49 and as this communicates with the exhaust manifold C, the gases are discharged into the same and are then free to discharge through the connections indicated at 20 and 21. The exhaust manifold is stationary and is secured to the upper end of the valve casing 10 by means of bolts 50. A running joint 51 is also formed between the upper hub portion 39 of the rotary valve and the exhaust manifold, and leakage is thus reduced to a minimum.

By referring to Figs. 3, 5, 11, 12 and 13 it will be noted that a deflector plate 31ª is placed in the exhaust port opening. This deflector plate is of considerable importance as it prevents the exhaust gases under high pressure from blowing back into an adjacent cylinder in which exhaustion is substantially completed. Furthermore, it serves the function of directing the exhaust gases upwardly along the inclined bottom plate 48 to the discharge opening 49 and the exhaust manifold.

A comparison of the valve mechanism shown in the present instance with that disclosed in Patent 1,666,513 will show that the number of parts required has been materially reduced, as a single rotary sleeve valve in this instance serves a plurality of cylinders, while the former valve mechanism required one rotary sleeve valve for each cylinder. It should also be noted that only one passage is formed in each cylinder head, and one sealing plug. These passages serve alternately as inlet and exhaust passages, and as such maintain a more uniform temperature, thereby reducing warping and expansion strains to a minimum, as the inlet gases tend to carry away a part of the heat of the exhaust gases. The former valve mechanism required two passages, one for exhaust and one for inlet, and it also required two sealing plugs, one for each passage.

The present structure permits a valve of a large diameter to be employed, it permits the use of a valve casing, it permits cooling of the exhaust gas passage by surrounding it with the cool intake gases, and as such reduces expansion stresses in the rotary sleeve valve itself to a minimum.

The valve casing shown in the present instance does not only serve as a housing or casing for the rotary sleeve valve proper but it also serves as a support for the exhaust manifold and as a support for the upper ends of the cylinders and the longitudinal standards 26, whereby the outer and intermediate bearings 60 and 61 of the main drive shaft are supported. These bearings are placed in close proximity to the rotary sleeve valve and the casing, and as such maintain this at all times centrally with relation to the valve casing and the cylinders. This is also important as a closely running fit may thereby be maintained between the rotary sleeve valve and the casing.

Another important feature of the present valve arrangement is its position, wherein it may be externally cooled by air, and internally cooled by means of the combustible mixture from the carbureter.

While certain features of the present invention are more or less specifically described, we wish it understood that various changes may be resorted to within the scope of the appended claims, similarly that the materials and finishes of the several parts employed may be such as the manufacturer may decide, or varying conditions or uses may demand.

Having thus described our invention, what we claim and desire to secure by Letters Patent is:

1. In a device of the character described, a valve casing; a plurality of cylinders connected therewith and each cylinder having a single combination inlet and exhaust port formed therein, one for each cylinder port and communicating therewith; a rotary sleeve valve mounted in the valve casing, said valve having an exhaust port formed in one side which is adapted to register with the casing and cylinder ports as the valve rotates; a second exhaust port in one end, said exhaust ports being connected by a passage; an exhaust manifold communicating with the end port, said valve also having an inlet port formed in one side; and a drive shaft extending through the valve and to which the valve is secured, said shaft having a conduit and ports formed therein in communication with the inlet port to convey a combustible mixture thereto.

2. In a device of the character described, a valve casing, a plurality of cylinders connected therewith and each cylinder having a single combination inlet and exhaust port formed therein, said valve casing having radially disposed ports formed therein, one for each cylinder port and communicating therewith; a rotary sleeve valve mounted in the valve casing, said valve having an exhaust port formed in one side which is adapted to register with the casing and cylinder ports as the valve rotates; and a second exhaust port in one end, said exhaust ports being connected by a passage; an exhaust manifold communicating with the end port, said valve also having an inlet port formed in one side; a drive shaft extending through the valve and the exhaust manifold, said shaft having a conduit and ports formed therein in communication with the inlet port to convey a combustible mixture thereto; and means securing the valve to the driving shaft.

3. In a device of the character described, a valve casing, a plurality of cylinders connected therewith and each cylinder having a single combination inlet and exhaust port formed therein, said valve casing having radially disposed ports formed therein, one for each cylinder port and communicating therewith; a rotary sleeve valve mounted in the valve casing, said valve having an exhaust port formed in one side which is adapted to register with the casing and cylinder ports as the valve rotates; and a second exhaust port in one end, said exhaust ports being connected by a passage; an exhaust manifold communicating with one end port, said valve also having an inlet port formed in one side; a drive shaft extending through the valve and the exhaust manifold, said shaft having a conduit and ports formed therein in communication with the inlet port to convey a combustible mixture thereto; means securing the valve to the driving shaft; and means securing the exhaust manifold to the valve cage.

4. In a device of the character described, a cylindrical shaped elongated sleeve valve; a hub member at each end thereof, a shaft extending through the hub members and secured therein; a partition member within the valve dividing it into two chambers; said valve having an inlet port formed in one face in communication with one chamber; an exhaust port in its face in communication with the other chamber; said valve also having an end port formed therein in communication with said last named chamber; a bevel member disposed in the exhaust port crosswise of the same and dividing the exhaust port into two sections; said bevel member assisting to deflect the gases into the exhaust chamber and the end port; and an inclined bottom section in the exhaust chamber to direct the exhaust gases from the divided face port to the end port.

5. In a device of the character described, a cylindrical shaped elongated sleeve valve; a hub member at each end thereof, a shaft extending through the hub members and secured therein; a partition member within the valve dividing it into two chambers; said valve having an inlet port formed in one face in communication with one chamber; an exhaust port in its face in communication with the other chamber; said valve also having an end port formed therein in communication with said last named chamber; a bevel member disposed in the exhaust port crosswise of the same and dividing the exhaust port into two sections; said bevel member assisting to deflect the gases into the exhaust chamber and the end port; an inclined bottom section in the exhaust chamber to direct the exhaust gases from the divided face port to the end port; and means for conveying a combustible mixture to the chamber with which the inlet port communicates.

6. In a device of the character described, a cylindrical shaped elongated sleeve valve; a hub member at each end thereof, a shaft extending through the hub members and secured therein; a partition member within the valve dividing it into two chambers; said valve having an inlet port formed in one face in communication with one chamber; an exhaust port in its face in communication with the other chamber; said valve also having an end port formed therein in communication with said last named chamber; a bevel member disposed in the exhaust port crosswise of the same and dividing the exhaust port into two sections; said bevel member assisting to deflect the gases into the exhaust chamber and the end port; an inclined bottom section in the exhaust chamber to direct the exhaust gases from the divided face port to the end port; means for conveying a combustible mixture to the chamber with which the inlet port communicates; said means comprising a conduit and ports formed in the drive shaft and communicating with the chamber.

JOHN R. JAHN.
JOHN W. SHANNON.